United States Patent
Wong

(10) Patent No.: US 7,114,714 B2
(45) Date of Patent: Oct. 3, 2006

(54) MULTIFUNCTIONAL WORKPIECE CLAMPING SYSTEM

(75) Inventor: Harry Wong, South Pasadena, CA (US)

(73) Assignee: Valtra, Inc., Pico Rivera, CA (US)

( * ) Notice: Subject to any disclaimer, the term of this patent is extended or adjusted under 35 U.S.C. 154(b) by 0 days.

(21) Appl. No.: 11/255,623

(22) Filed: Oct. 21, 2005

(65) Prior Publication Data

US 2006/0091598 A1 May 4, 2006

Related U.S. Application Data

(60) Provisional application No. 60/623,618, filed on Oct. 28, 2004.

(51) Int. Cl.
*B25B 1/20* (2006.01)

(52) U.S. Cl. ......................................... 269/45

(58) Field of Classification Search ................. 269/45, 269/166–167, 299, 152–155, 97, 98, 287, 269/100, 170, 902, 279–284; 81/436

See application file for complete search history.

(56) References Cited

U.S. PATENT DOCUMENTS

| | | |
|---|---|---|
| 737,527 A | 8/1903 | Teilborg |
| 2,610,661 A | 9/1952 | Romine |
| 2,642,905 A | 6/1953 | Hewat |
| 3,403,901 A | 10/1968 | Servadio |
| 3,697,046 A | 10/1972 | Sur |
| 3,934,316 A | 1/1976 | Driscoll |
| 4,134,578 A | 1/1979 | Stanley |
| 4,363,475 A | 12/1982 | McCarty |
| 4,483,573 A | 11/1984 | Keller |
| 4,867,427 A | 9/1989 | Cunningham |
| 4,962,918 A | 10/1990 | Yang |
| 5,135,209 A | 8/1992 | Penny |
| 5,163,662 A | 11/1992 | Bernstein |
| 5,187,877 A | 2/1993 | Jory |
| 5,190,271 A | 3/1993 | Otterbein |
| 5,192,060 A | 3/1993 | Novak |

(Continued)

FOREIGN PATENT DOCUMENTS

CH   371768   8/1963

(Continued)

*Primary Examiner*—Robert C. Watson
(74) *Attorney, Agent, or Firm*—Bruce A. Jagger

(57) ABSTRACT

A multi-function clamping system composed of a few interacting and interoperative clamping components. It is based around a J-bar to which other clamping components such as X-axis, Y-axis, extender blocks, L-links, bench rests, joint V-blocks, and V-pad clamping components can be threadably or slidably assembled into a wide variety of configurations. The multi-function clamping system that can be configured for expansive or compressive clamping, simultaneous or sequentially clamping along one or several axes, clamping of one or more workpieces, clamping of two or more workpieces in various positions relative to one another, clamping of workpieces in various crafts such as, for example, welding, woodworking, machining, mechanical repair, and the like.

9 Claims, 8 Drawing Sheets

U.S. PATENT DOCUMENTS

| | | |
|---|---|---|
| 5,312,097 A | 5/1994 | Womack |
| 5,405,124 A | 4/1995 | Mayer et al. |
| 5,482,263 A | 1/1996 | Kutzleb |
| 5,687,856 A | 11/1997 | Kendrena |
| 5,697,601 A | 12/1997 | Gurule |
| 5,718,419 A | 2/1998 | Hall |
| 5,730,434 A | 3/1998 | Schoene |
| 5,819,577 A | 10/1998 | D'Arcy |
| 5,893,553 A | 4/1999 | Pinkous |
| 5,947,428 A | 9/1999 | Ohl |
| 5,992,836 A | 11/1999 | Howe |
| 6,364,302 B1 | 4/2002 | Ausilio |
| 6,609,706 B1 | 8/2003 | Shibata |

FOREIGN PATENT DOCUMENTS

| | | |
|---|---|---|
| DE | 3226248 C1 | 11/1983 |
| FR | 9615462 | 6/1998 |

MULTIFUNCTIONAL WORKPIECE CLAMPING SYSTEM

RELATED APPLICATIONS

This application claims the benefit of U.S. Provisional Application Ser. No. 60/623,618, filed Oct. 28, 2004.

BACKGROUND OF THE INVENTION

1. Field of the Invention

The invention relates in general to methods and devices for a multifunctional workpiece clamping system and, more particularly, embodiments of the present invention relate to a single clamping system including a plurality of components, which, when taken together, expand the functionality of the system into areas where a plurality of different clamping systems had previously been required.

2. Description of the Prior Art

Complex single purpose clamping fixtures had been widely used in manufacturing for many years. Such fixtures were assembled in one fixed configuration for a single purpose, and had no other capabilities. Many prior multi-purpose clamping devices had also been proposed. They include, for example, C-clamps with Y-axis clamping capabilities, and various links and pivoting blocks to accommodate different shaped workpieces. See, for example, Romine 2,610,661, Hewat 2,642,905, Yang 4,962,918, Gurule 5,697,601, Pinkous 5,893,553. Clamping devices that clamp in expansion as well as compression had been proposed. See, for example, Driscoll 3,934,316. Clamping expedients in which a clamping plate or shaped bracket is threadably mounted to a jaw of a C-clamp opposed to a clamping screw had been proposed. See, for example, Penny 5,135,209. Bench rests for C-clamps had been proposed. See, for example, McCarty 4,363,475. Adjustable V-pads had been proposed. See, for example, Stanley 4,134,578. Various expedients for clamping workpieces of various shapes in angular relationships to one another had been proposed. See, for example, Howe 5,992,836, Hall 5,718,419, and Kutzleb 5,482,263. Many proposed prior expedients were particularly suited for one craft, such as, for example, welding, woodworking, or the like. The proposed prior art multi-purpose expedients were not without their shortcomings. A major shortcoming of typical prior art expedients is the limited functionality of any one clamping device. The accomplishment of a variety of functions required a variety of clamping devices. That is, a given prior art expedient could not be first configured to perform one set of functions and then reconfigured to perform an entirely different set of functions. It was generally necessary to provide a wide variety of clamping systems to accomplish a variety of functions. This multiplied the cost and the storage requirements for different clamping systems.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available. Thus, it is an overall object of the present invention to effectively resolve at least the problems and shortcomings identified herein. In particular, it is an object of the present invention to provide a multi-function clamping system composed of a few inter-acting and interoperative clamping components. It is also an object of the present invention to provide a multi-function clamping system that is based around a J-bar to which other clamping components are threadably or slidably assembled into a wide variety of configurations. Finally, it is an object of the present invention to provide a multi-function clamping system that can be configured for expansive or compressive clamping, simultaneous or sequentially clamping along one or several axes, clamping of one or more workpieces, clamping of two or more workpieces in various positions relative to one another, and clamping of workpieces in various crafts such as, for example, welding, woodworking, machining, mechanical repair, and the like.

The tooling components of the present system can be assembled in many different ways to provide clamping force on workpieces from two or more directions for purposes of facilitating the performance of various operations on or with such objects. The components are releasably assembled to one another and to various other objects so that they are readily available for reuse. The versatility of the system is considerably enhanced by providing for the releasable assembly of the components. The satisfactory performance of the desired clamping purposes requires that the components function together to provide secure clamping. Providing such secure clamping throughout a wide variety of configurations requires that the components of the system be carefully selected and designed to function as intended throughout such configurations. Providing the flexibility to create a wide variety of configurations from a minimum number of components substantially enhances the utility of the system beyond that provided by the various components considered one by one. For purposes of illustration a few of the many possible configurations are shown in this application. These will serve to suggest to those skilled in the art many other configurations into which the clamping components of the present kit invention can be assembled.

To acquaint persons skilled in the pertinent arts most closely related to the present invention, a preferred embodiment of a multifunctional workpiece clamping system that illustrates a best mode now contemplated for putting the invention into practice is described herein by, and with reference to, the annexed drawings that form a part of the specification. The exemplary embodiments are described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings.

BRIEF DESCRIPTION OF THE DRAWINGS

As those skilled in the art will recognize, the basic system taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation:

FIG. 16 diagrammatically depicts various details of an embodiment of a clamping fixture using components of a clamping system according to the present invention wherein two J-bars, in C-clamp compression configurations, are joined at right angles by a long L-link component to position two workpieces or the like in precise angular relationship to one another. A V-pad is employed in association with the pad on the end of the foot on one of the J-bars to accommodate a round workpiece or the like.

FIG. 18 diagrammatically depicts various details of an embodiment of the present invention wherein two clamping assemblies with both X and Y axis clamping capabilities are used separately to clamp a single workpiece or the like.

DETAILED DESCRIPTION OF THE PREFERRED EMBODIMENTS

Figure 1:
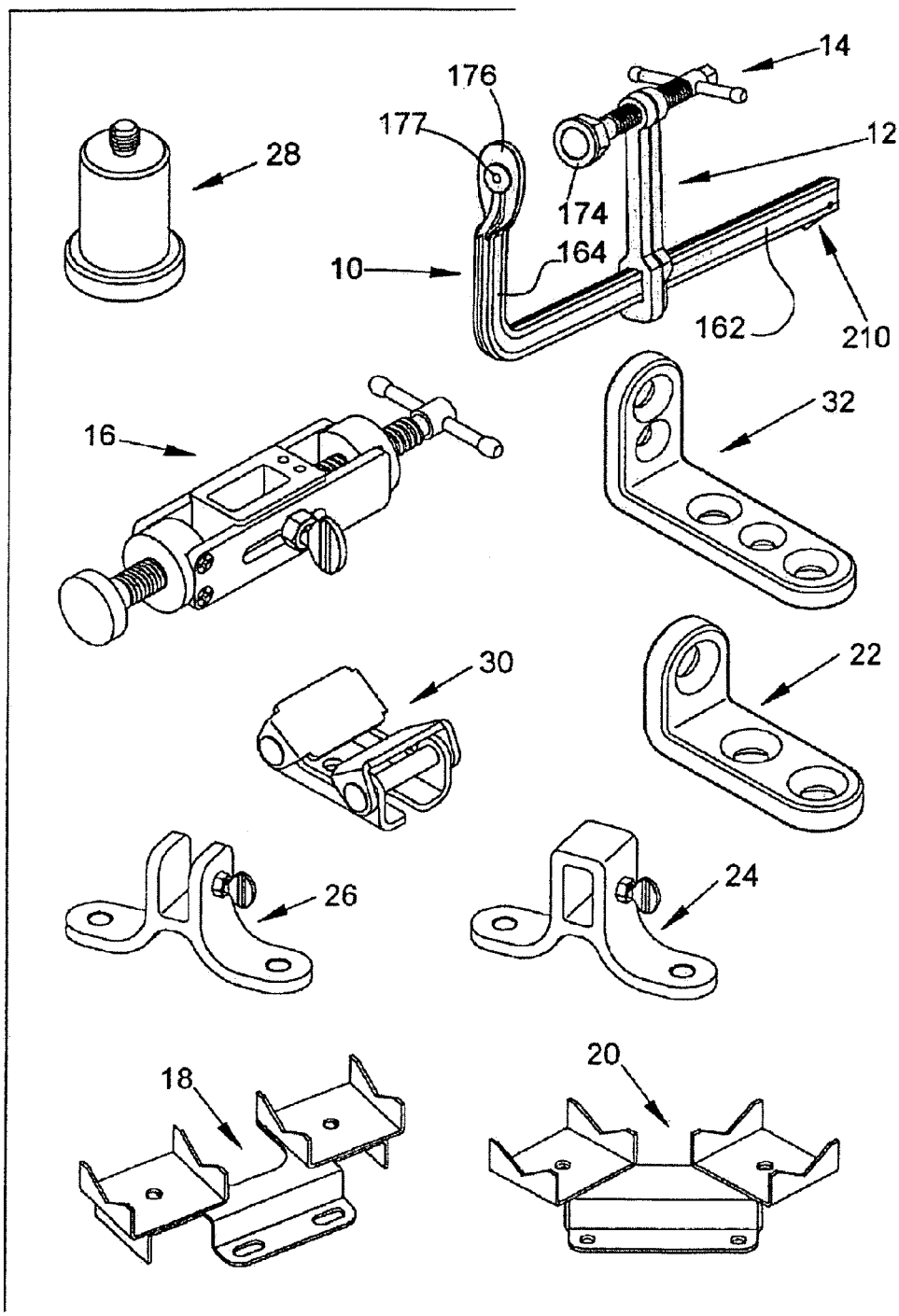
FIG. 1 is an exploded diagrammatic view of a preferred embodiment of the invention showing a multiplicity of clamp components for use in a clamping system wherein most of the clamp components are in an unassembled configuration. The backbone of the system is provided by a J-bar component. The J-bar is shown assembled in a basic adjustable C-clamp configuration with an X-axis clamp screw mounted to the rail arm of the J-bar component through a sliding clamp arm.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein. As used herein, the term "workpiece" is intended to include all objects whether, raw materials that are under fabrication, clamp components, tools, substrates, measuring instruments, or other objects.

Referring particularly to the drawings, there is illustrated generally at 10 (FIG. 1) a J-bar clamping component including a rail arm 162, an extended foot 164. A pad 176 having a fastener mounting element in the form of threaded bore 177 extending therethrough is located at the distal end of extended foot 164. The longitudinal axis of threaded bore 177 is preferably generally axially aligned with the longitudinal axis of rail arm 162. A detent 210 is provided at the distal end of rail arm 162. Detent 210 serves to releasably retain other clamping components that are slidably mounted on rail arm 162 in assembled configuration with J-bar 10. J-bar 10 serves as a backbone for the multifunctional workpiece clamping system of the present invention. The other components of the system are generally either mounted by means of a threaded fastener through threaded hole 177, or slidably mounted on rail arm 164. The use of multiple J-bars greatly increases the functionality of the system. See, for example, FIGS. 16, 17, and 18.

A sliding clamp arm component, indicated generally at 12, together with an X-axis clamp screw component, indicated generally at 14, provides adjustable C-clamp functionality when combined with J-bar 10 (FIG. 1). The rail arm 162 has a generally rectangular cross-section, and the components that are adapted to be slidably mounted on rail arm 162 have mating passageways. The mating cross-sections serve to prevent the components from rotating about the longitudinal axis of the rail arm 162 while permitting them to slide longitudinally of the rail arm 162. Other rotation preventing cross-sections can be used, if desired. For example, a rail arm having a round cross section with radially extending key ways or radially projecting ribs, or an egg-shaped cross-section, or the like could be employed provided the mating cross-section in the associated component matches so as to permit the component to slide longitudinally of the rail arm. Generally, the rail arm 162 is approximately straight. Generally, the application of clamping force causes a slidably mounted component to bind on the rail arm so as to lock the component in a fixed longitudinal location along the rail arm 162. Additional releasable position fixing elements can be provided, if desired. For example, a thumb screw, or the like can be employed.

An X-axis clamping component, indicated generally at 14 (FIG. 1), slidably and removably mounts on rail arm 162 through a sliding clamp arm component indicated generally at 12. This X-axis component functions to apply clamping pressure at an angle, typically approximately parallel to the longitudinal axis of the rail arm 162. An X-axis clamping component can, for example, be mounted to apply pressure at other angles that occur generally within a cone extending from the X-axis component generally towards the region of the pad 176. Typically, clamping pressure is applied by means of a manually actuated screw although other mechanisms such as, for example, hydraulic cylinders can be employed as the source of the clamping force, and the X-axis component can be adjusted or actuated by electric, pneumatic, or hydraulic motors, or the like, if desired.

Figure 2:
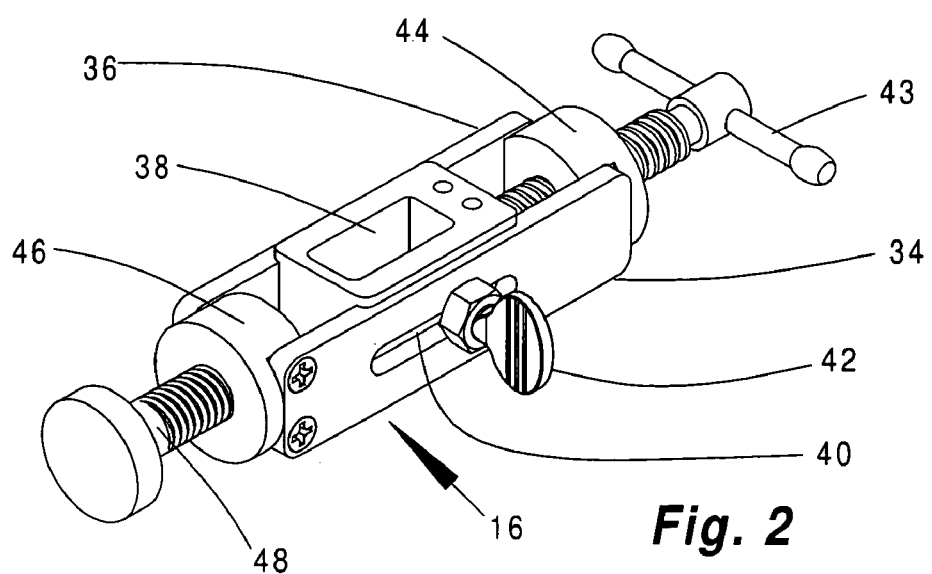
FIG. 2 diagrammatically depicts one embodiment of a Y-axis clamp component for use in accordance with the teachings of the present invention FIG. 3 diagrammatically depicts various details of an embodiment of an angle bracket clamp component according to the teachings of the present invention.

A Y-axis clamping component, indicated generally at 16 (FIGS. 1 and 2), is adapted to being removably and slidably mounted to rail arm 162. Typically, Y-axis clamping component 16 acts to apply clamping pressure at an angle which is typically approximately normal to the longitudinal axis of the rail arm 162. See, for example, FIG. 18. A Y-axis clamping component can, for example, be mounted to apply pressure at other angles that occur generally within a cone extending from the Y-axis component towards the longitudinal axis of threaded hole 177. Typically, adjustments are made and clamping pressure is applied by means of one or more manually actuated screws, although other mechanisms such as, for example, hydraulic cylinders or the like can be employed as the source of the clamping force, and the Y-axis component can be adjusted or actuated by electric, pneumatic, or hydraulic motors, or the like, if desired.

Figure 3:
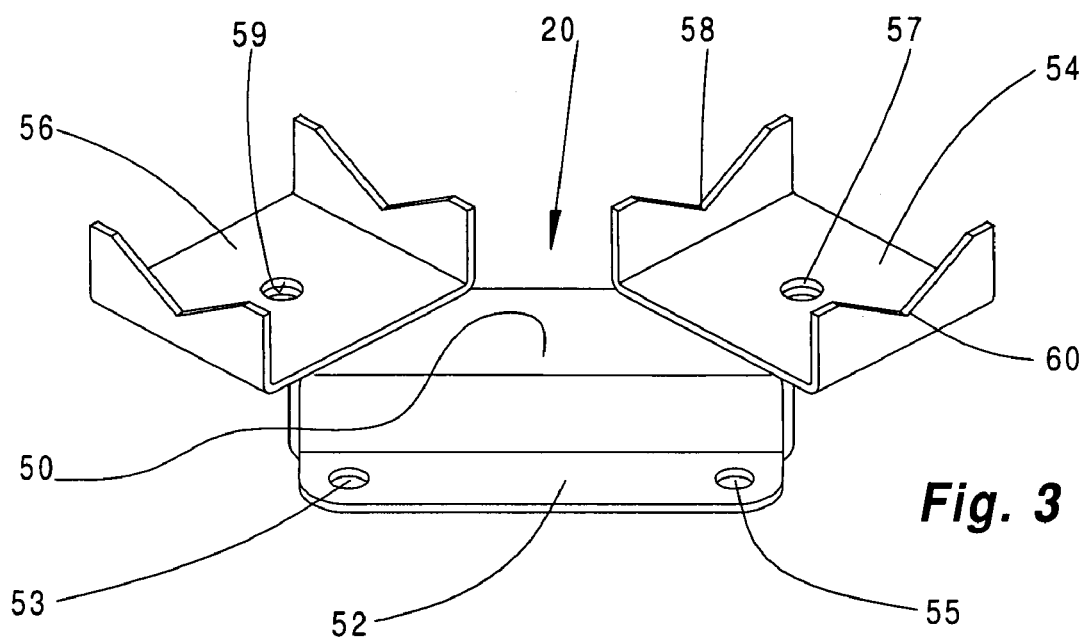
Figure 4:
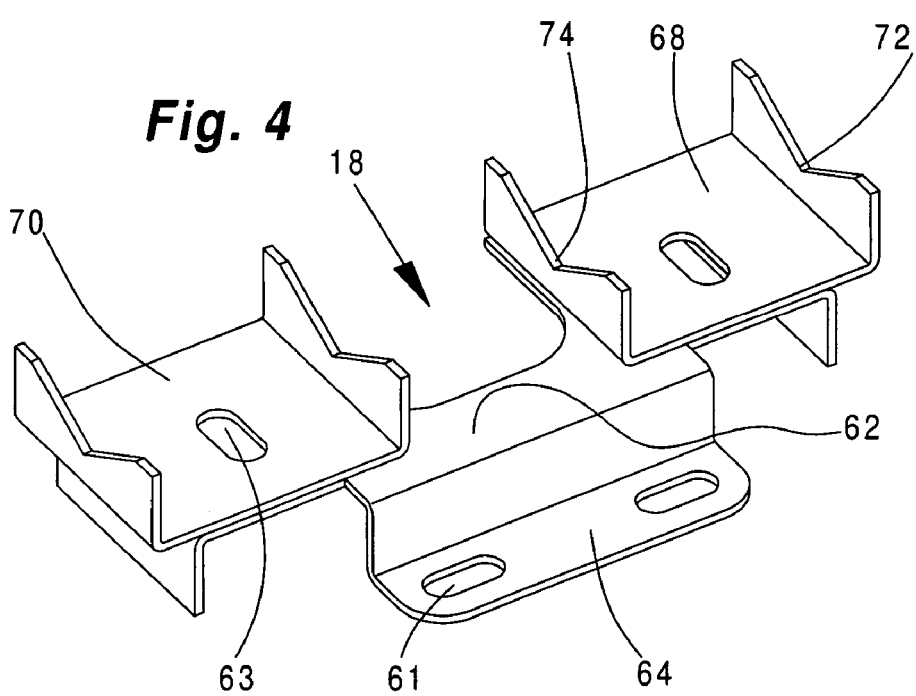
FIG. 4 diagrammatically depicts various details of an embodiment of a straight bracket clamp component according to the teachings of the present invention.
Figure 17:
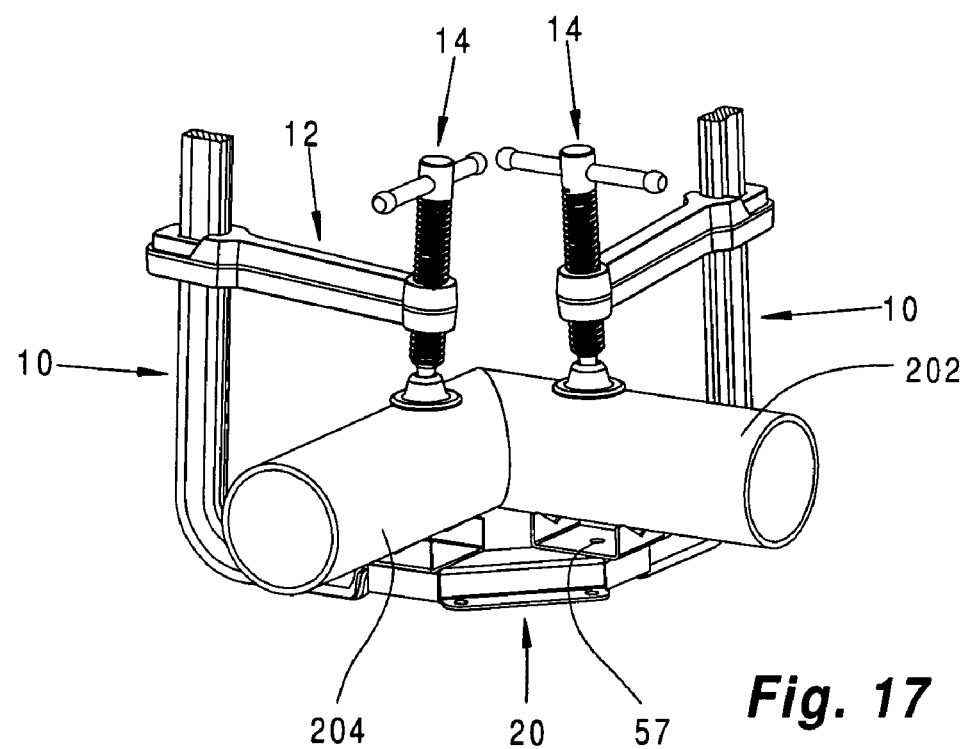
FIG. 17 diagrammatically depicts various details of an embodiment of a clamping fixture using components of a clamping system according to the present invention wherein two J-bars are deployed in compression C-clamp configurations and are joined together through an angle bracket component. Aligned V-panels on the angle bracket component hold generally cylindrical workpieces or the like at the angle to one another that is defined by the angle bracket component.

Joint V-block clamp components function to receive, for example, two generally cylindrical workpieces and hold them at predetermined angles to one another for the purpose of facilitating the formation of a joint between them. Straight joint V-block component 18 (FIGS. 1 and 4) is adapted to being mounted by a screw to one or more J-bars, or to a bench or other substrate or component. Angled joint V-block component 20 (FIGS. 1 and 3) is adapted to being mounted by a screw to one or more J-bars, or to a bench or other substrate or component (FIG. 17). A joint V-block typically includes two V-block pads. One pad holds one workpiece while a second V-block pad holds a second workpiece. In general, the objective is to hold the two workpieces at some predetermined angle relative to one another. The V-block pads can be mounted in the joint V-block clamp component so as to define either fixed or variable angles between the workpieces.

Figure 5:
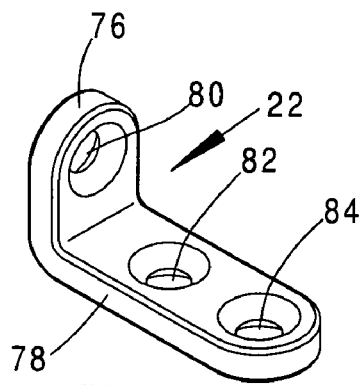
FIG. 5 diagrammatically depicts various details of an embodiment of a short L-link clamp component according to the teachings of the present invention.
Figure 8:
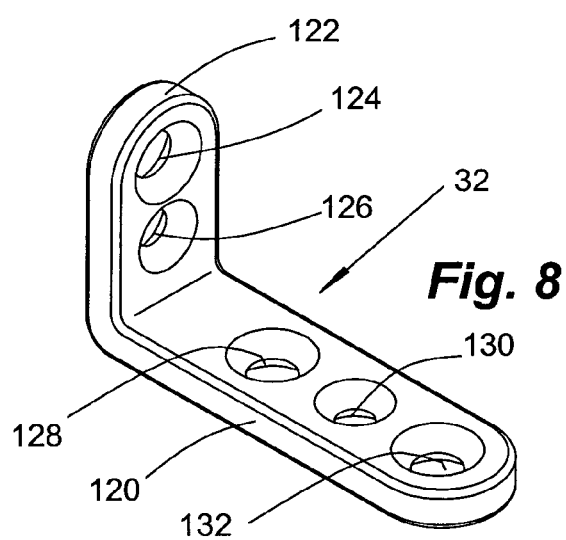
FIG. 8 diagrammatically depicts various details of an embodiment of a long L-link clamp component according to the teachings of the present invention.
Figure 12:
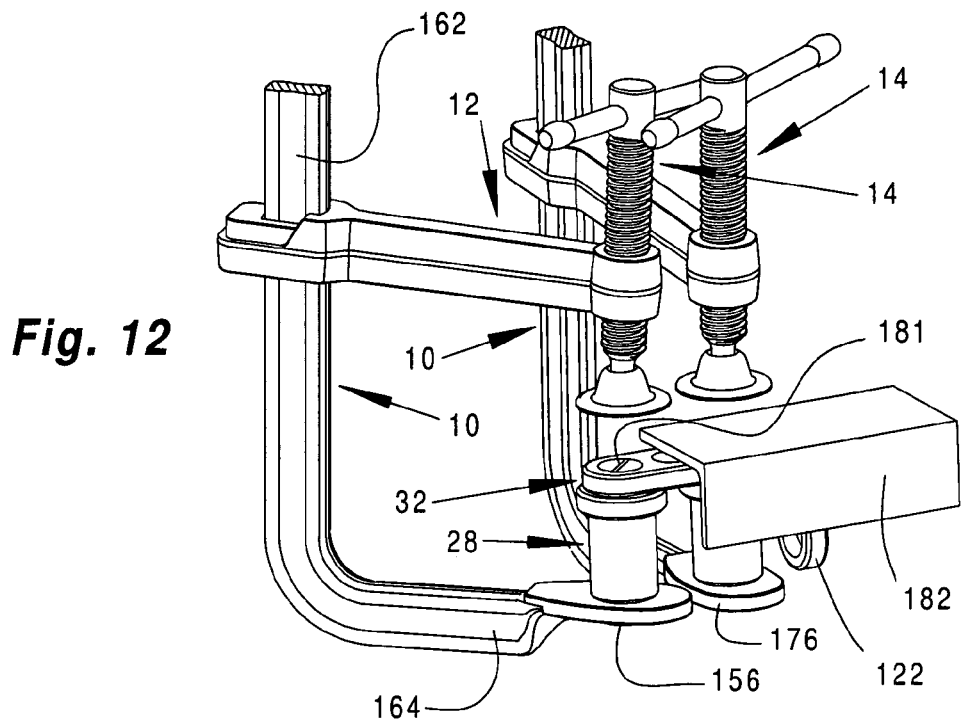
FIG. 12 diagrammatically depicts various details of an embodiment of a clamping fixture using components of a clamping system according to the present invention wherein two J-bars are deployed in C-clamp configurations with extension blocks and a long L-link clamping component joining the two J-bars together.
Figure 16:
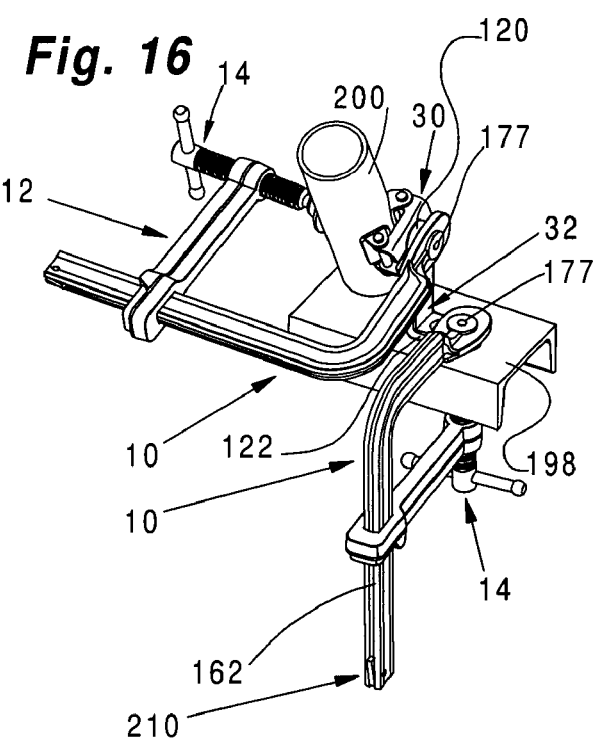

L-link components are provided in various lengths for the purpose of, for example, mounting 2 or more J-bars at predetermined angles relative to one another. Short L-link 22 and long L-link 32 (FIGS. 1, 5 and 8) are adapted, through attachment by screws in threaded holes 177, to mounting two J-bars at right angle to one another (FIGS. 12 and 16). L-links 22 and 32 are also adapted to mount a J-bar at a right angle to a bench, some other supporting surface, another tooling component, or the like. L-links can be provided with arms extending at other than about 90 degrees to one another, if desired.

Figure 6:
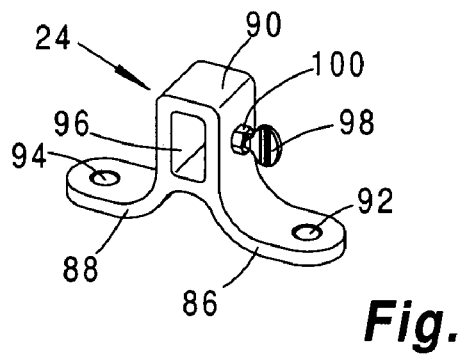
FIG. 6 diagrammatically depicts various details of an embodiment of a closed bench rest clamp component according to the teachings of the present invention.
Figure 7:
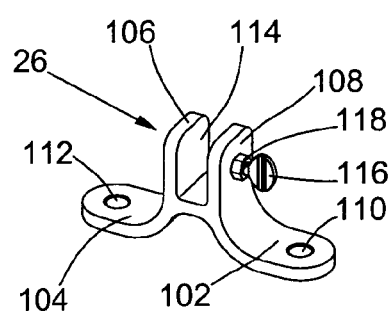
FIG. 7 diagrammatically depicts various details of an embodiment of an open bench rest clamp component according to the teachings of the present invention.
Figure 14:
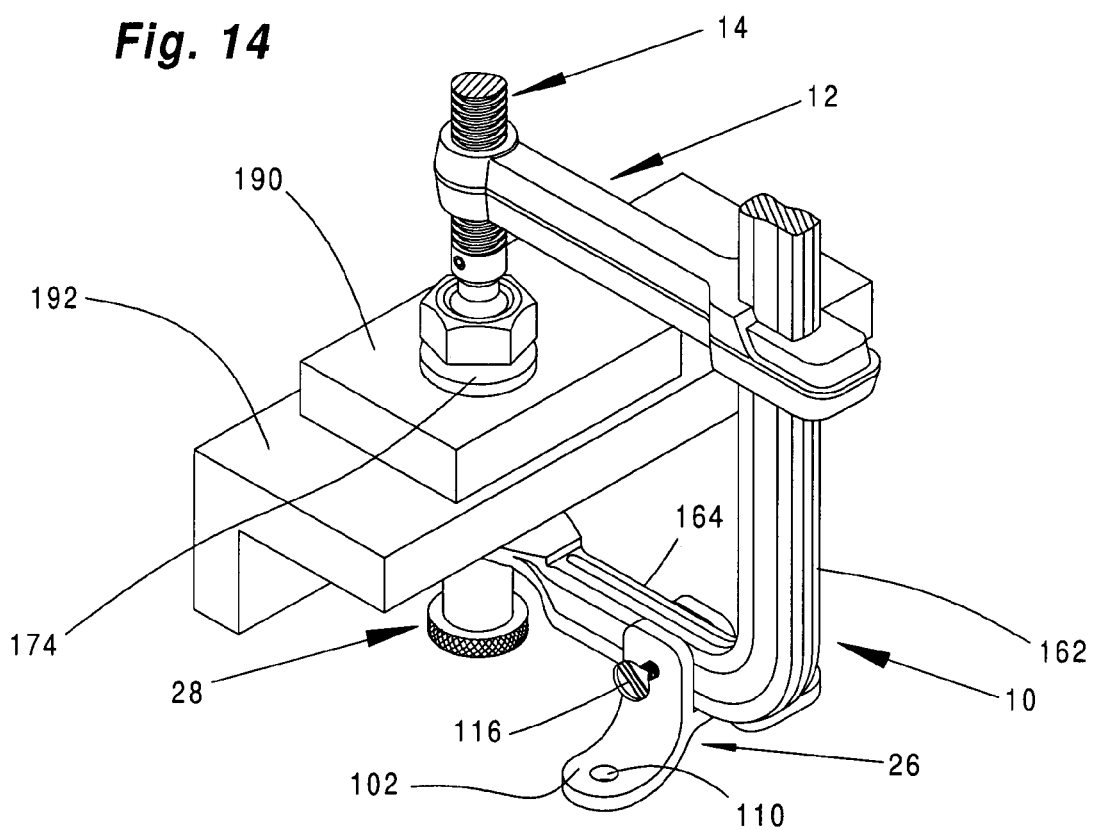
FIG. 14 diagrammatically depicts various details of an embodiment of a clamping fixture using components of a clamping system according to the present invention wherein one J-bar, in a C-clamp compression configuration, is mounted in an open bench rest with an extension block positioned to rest on the surface of a bench to which the open bench rest component is mounted.
Figure 15:
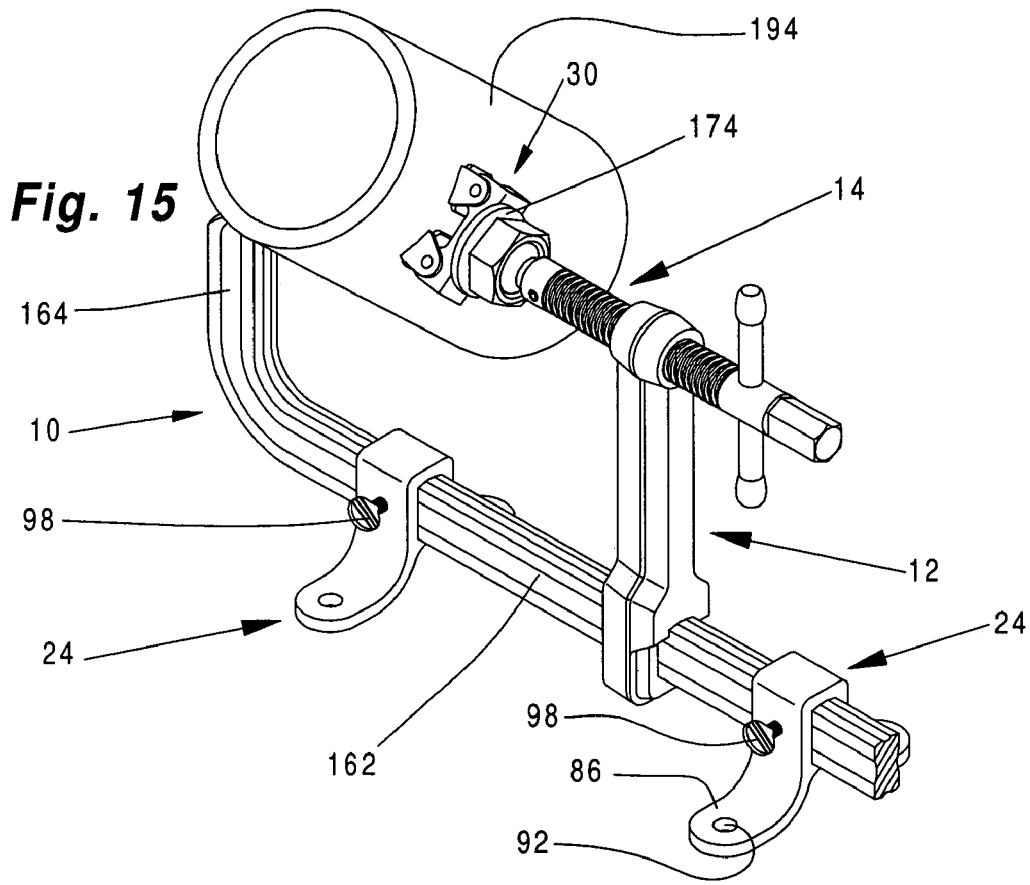
FIG. 15 diagrammatically depicts various details of an embodiment of a clamping fixture using components of a clamping system according to the present invention wherein one J-bar, in a C-clamp configuration, is used in a compression assembly with the rail arm of the J-bar slidably mounted in two closed bench rests. An X-axis clamp screw bears clampingly against a cylindrical workpiece or the like through a V-pad.

Bench rests generally serve to mount a J-bar to a bench or other supporting surface so as to provide a fixed work station involving one or more workpiece clamping functions. Closed bench rest 24 and open bench rest 26 (FIGS. 1, 6 and 7) are adapted to being attached to a bench or other substrate, and to retainingly receive rail arm 162 (FIGS. 14 and 15). Open bench rest 26 permits rail arm 162 to be dropped into its open channel and locked there, for example, by a thumb-screw. The closed bench rest 26 requires that the rail arm 162 be threaded through a closed passageway. The open bench rest is particularly, although not exclusively, suited to situations where the clamping system is clampingly applied to a workpiece at one location, and then moved to a bench where the workpiece-clamp assembly is mounted to the open bench rest for the performance of further operations. The closed bench rest is more suited to situations where the workpiece-clamp assembly is formed while the J-bar is mounted to the bench through the closed bench rest.

Figure 10:
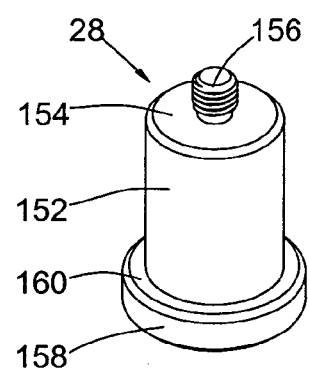
FIG. 10 diagrammatically depicts various details of an embodiment of an extender block clamp component according to the teachings of the present invention.

An extender block component, indicated generally at 28 (FIGS. 1 and 10), is adapted to being threadably attached to J-bar 10, other components, or the like, for example, by way of threaded hole 177. Extender block 28 can be mounted on either side of pad 176. See, for example, FIGS. 11 and 13. Extender block 28 typically includes a threaded bore on one end, which is axially aligned with a threaded stud on the other end. Extender block 28 is typically used to facilitate the clamping of a workpiece where the shape of the workpiece is such that part of the clamp system would otherwise contact the workpiece and interfere with the clamping function. Extender block 28 serves as both a spacer (FIG. 12) and a mounting element (FIG. 14). A J-bar can be supported on a bench or other substrate through an extender block 28 (FIG. 14). If more distance is required, extender blocks 28 can be threadably stacked together.

Figure 9:
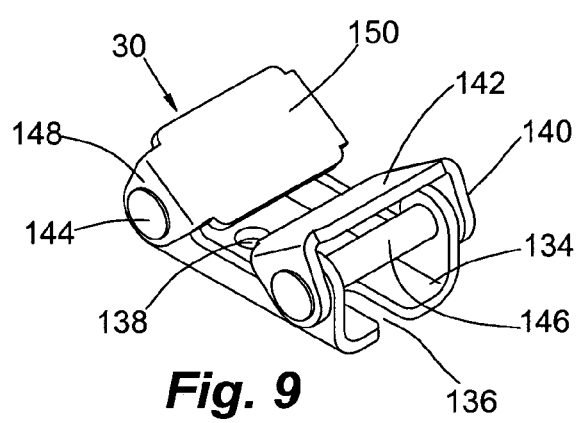
FIG. 9 diagrammatically depicts various details of an embodiment of a V-pad clamp component according to the teachings of the present invention.

A V-pad component, indicated generally at 30 (FIGS. 1 and 9), is adapted to being threadably mounted to other clamp components (FIG. 16) or some other substrate. The nature of V-pad 30 is such that in some configurations it does not require anything more than clamping pressure to hold it in assembly with a clamped workpiece (FIG. 15). The workpiece contacting pads of V-pad 30 are pivotally mounted so that they can automatically adjust under clamping pressure to generally conform to the shape of a workpiece, from concave, through flat, to convex or compound. As illustrated, the workpiece pads only pivot about a single axis. As will be understood by those skilled in the art, if desired, the pads can be mounted to swivel about a single point so as to provide omni-directional positioning.

Figure 11:
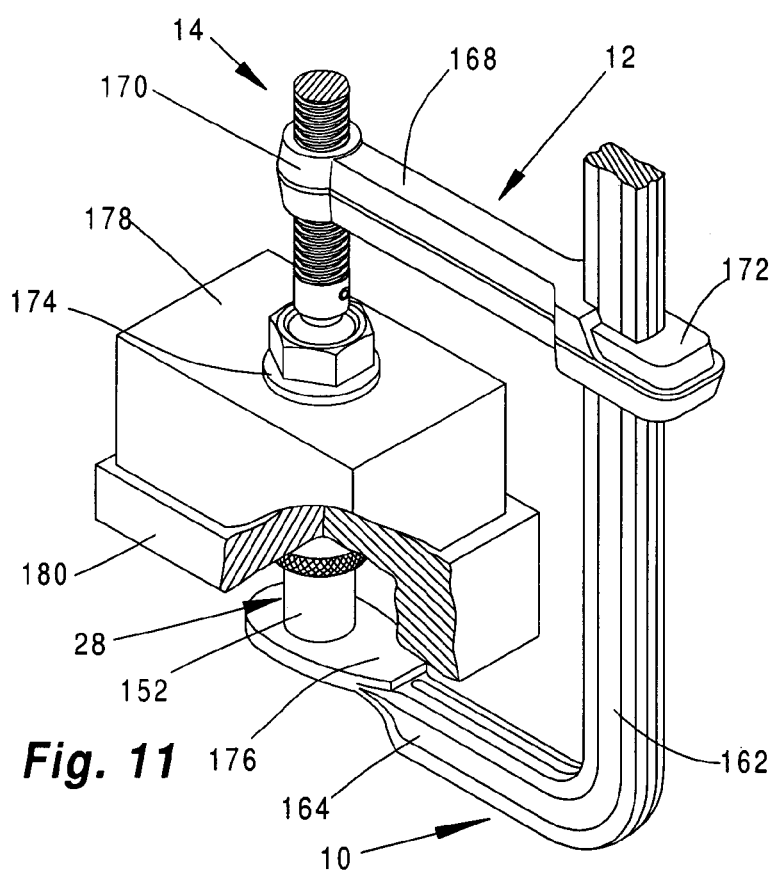
FIG. 11 diagrammatically depicts various details of an embodiment of a clamping fixture using components of a clamping system according to the present invention wherein a J-bar is assembled in a basic adjustable C-clamp configuration in operable relationship with an extender block mounted to the pad on the end of the foot of the J-bar to accommodate the clamping of a workpiece or the like that has a concave configuration.

Sliding clamp arm component 12, in the embodiment chosen for illustration, generally includes an arm 168 that extends between a proximal rail receiving end 172, and a distal screw mounting end 170 (FIG. 11). This component is typically assembled to a J-bar by slidable attachment. X-axis clamping component 14 includes a conventional swiveling foot pad 174 mounted to the end of a clamping screw. The X-axis clamping screw is threadably mounted in distal end 170 of sliding clamp arm 12. Coarse adjustments in the distance between foot pad 174 and a workpiece are generally accomplished by sliding proximal end 172 of clamp arm 12 along rail arm 162 until foot pad 174 makes contact with the workpiece. Fine adjustments are made and clamping force is applied by manual rotation of the X-axis clamping screw in distal end 170 of arm 168. The clamping force generated by the threadable actuation of the X-axis screw, acting through the length of arm 168, causes the rail passageway in proximal end 172 to jam against rail arm 162. This locks the arm 168 in place on rail arm 162. Releasing the clamping force on the workpiece also releases the arm 168 to slide relative to the rail arm 162.

The Y-axis clamping component 16 (FIGS. 1 and 2), in the embodiment chosen for illustration, includes first rail 34, second rail 36, rail mounting block 38, captive nut 44, clamp screw nut 46, and Y-axis clamping screw 48. This component is typically assembled to a J-bar by slidable attachment. Captive nut 44 is welded to the distal ends of rails 34 and 36. A screw-actuator handle assembly 43 is threadably mounted to captive nut 44. Assembly 43 is attached to rail mounting block 38 so that threadable movement of assembly 43 in captive nut 44 causes rail mounting block 38 to move slidably between rails 34 and 36 between the proximal and distal ends of these rails. Y-axis clamping screw 48 is threadably mounted in clamp screw nut 46 for axial movement along the longitudinal axis of Y-axis clamping component 16. Thumb screw 42 is threadably received in a threaded hole (not shown) in rail mounting block 38 so that it moves with the rail mounting block between the proximal and distal ends of the respective rails. Thumb screw 42 moves within adjustment slot 40 in first rail 34. A jam nut is provided on thumb screw 42 so that it and rail mounting block 38 can be locked in place, if desired. Y-axis clamping screw can be threadably adjusted to bring the pad on the end of this screw into contact with a workpiece. Clamping pressure on the workpiece can be applied or relieved by threadably actuating assembly 43. Rail arm 162 projects slidably through the passageway in rail mounting block 38. In the embodiment chosen for illustration, the Y-axis clamping component applies clamping pressure generally normal to the longitudinal axis of rail arm 162.

The joint V-block components 18 and 20, respectively, in the embodiments chosen for illustration (FIGS. 3 and 4), are adapted to being mounted through fastening members to other clamping components, workpieces, other substrates, and the like. Typically, joint V-block components are employed to clamp workpieces while a joint is formed between them. These joint V-block components are not limited to just joint forming operations. Angled joint V-block 20 includes a base element 50 to which a first V-block 54 and a second V-block 56 are mounted. In this embodiment the V-blocks 54 and 56 are permanently mounted at about mounting holes 57 and 59 to the base element 50 in a fixed angular relationship of about 90 degrees to one another. One or both of the V-blocks can be pivotally mounted, if desired. Base element 50 includes a support flange 52 that is adapted to bear against a supporting surface and to be attached thereto through support mounting hole 53 and 55. Mounting holes 57 and 59 likewise serve to mount Joint V-block component 20 to a support. Typically, mounting holes 57 and 59 serve to mount this component through a threaded fastener, directly or indirectly, to a J-bar (FIG. 17), while support mounting holes 53 and 55 are typically used to mount this component to a bench or other substrate. Holes 53, 55, 57, and 59 are shown as round holes, but they can be elongated for purposes of adjustment. See, for example, the mounting holes in FIG. 4. First V-panel 58 is formed with a V-shaped notch in the top edge. This notch serves to engage and center a worpiece, particularly a round workpiece, in the V-panel. Second V-panel 60 is provided on the opposed edge of V-block 54 with a V-notch in its upper edge. V-panels 58 and 60 together serve to engage and center a workpiece both laterally and longitudinally. The V-panels on second V-block 56 function similarly. Straight joint V-block 18 is formed similarly to angled V-block 20 and serves substantially the same function except that it is adapted to hold workpieces in longitudinal axial alignment with one another. Mounting flange 64 depends from base element 62 and is adapted to being mounted to a substrate through fasteners engaged in holes of which 61 is typical. First V-block 68 and second V-block 70 function to support workpieces. First V-panel 72 and second V-panel 74 are disposed on opposed edges of first V-block 68, and function as the corresponding V-panels in FIG. 3. Second V-block 70 functions similarly to first V-block 68.

The L-link components 22 and 32, respectively, in the embodiments chosen for illustration (FIGS. 5 and 8), are adapted to serving as links between clamping components, one another, substrates, tools, workpieces, and the like (FIGS. 12 and 16). This component is typically assembled to other components through at least one releasable fastener element. In these embodiments, the long legs, 78 and 120, respectively, are joined at about a right angle to short legs 76 and 122, respectively. Mounting holes 80, 82, 84, 124, 126, 128, 130, and 132 serve to mount these L-links through suitable fasteners to whatever they are attached to. These L-link components are particularly well suited to being attached, directly or indirectly, to J-bars so as to provide right angle functionality for other clamping components.

The closed J-bar mounting bench rest component 24, in the embodiment chosen for illustration (FIG. 6), is particularly adapted, for example, to mounting a J-bar at a fixed work station on a bench or other substrate, or the like (FIG. 15). This component is typically assembled to a J-bar by slidable attachment. Closed bench rest component 24 includes a rail mounting block 90 with a rail receiving port 96 therethrough. A thumb screw 98 is threadably mounted in the wall of rail mounting block 90 so as to threadably bear against rail arm 162. When tightened down, this locks the rail arm 162 in the rail receiving port 96. The thumb screw can be locked in place by means of tightening lock nut 100. This holds the J-Bar in generally fixed relationship to whatever substrate the closed bench mount is attached to. Attachment to substrates, other tooling components, tool, or the like is generally accomplished by inserting fasteners such as screws, rivets, or the like through mounting holes 92 and 94 in mounting legs 86 and 88, respectively.

The open J-bar mounting bench rest component 26, in the embodiment chosen for illustration (FIG. 7), is particularly adapted, for example, to mounting a J-bar at a fixed work station on a bench or other substrate, or the like (FIG. 15). This component is typically assembled to a J-bar by the rail arm of the J-bar being dropped into the channel 114. Thus, the open bench mount 26 remains fixed to a bench, other tooling component, tool, or the like, and the J-bar can be quickly attached and deattached as desired. The open bench mount 26 is conveniently attached to a bench or the like by means of a fastener element projected through holes 110 and 112 in legs 102 and 104, respectively, into engagement with the bench (FIG. 14). A thumb screw 116 and associated lock or jam nut 118 are provided to secure a J-bar in the open bench rest 26.

The extender block component 28, in the embodiment chosen for illustration (FIG. 10), is adapted to being used as a spacer or extender, and is adapted to being threadably mounted to threaded hole 177 by means of threaded stud 156 or a threaded fastener engaged in a threaded bore (not shown) on the opposed end of extender block 28 from the face 154 from which threaded stud 156 projects. The threaded bore is generally axially aligned with threaded stud 156. The face 154 is adapted to bear against J-bar pad 176 or any other surface to which it is mounted. Body 152 is preferably cylindrical for ease of manufacturing as well as to provide a mounting location for objects with cylindrical through bores, if desired. Flange 160 serves to step the body 152 out so as to provide collar 158. Collar 158 provides a convenient way of grasping component 28 for threadably applying it to a J-bar, other tooling component, substrate, or the like. The outer perimeter of collar 158 can be knurled for ease of grasping, if desired.

The V-pad component 30, in the embodiment chosen for illustration (FIG. 9), is particularly adapted to being releasably mounted directly or indirectly to a clamping component or other object through a suitable fastening element such as a screw, rivet, or the like. These components, as well as many other components of this system, can be held in an assembled configuration by clamping force alone. This clamping force assembly procedure for various components may be preferred where a quick one-time use configuration is intended. The adaptability of this system is such that many such configurations with various components are possible. Mounting is accomplished, for example, by use of mounting hole 138 and mounting slot 136 in yoke 134. Pivoting V-pads 142 and 150 are pivotally mounted to yoke 148 through pivot pins 144 and 146. The pivoting V-pads 142 and 150 are mounted through mounting brackets of which 148 and 140 are typical. These V-pads pivot independently of one another.

Figure 19:
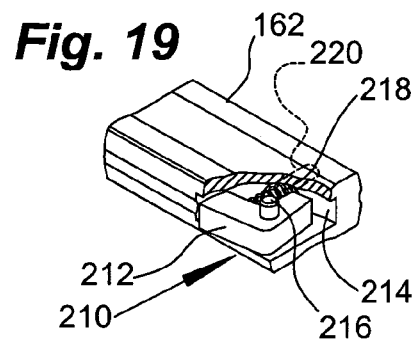
FIG. 19 diagrammatically depicts a detent assembly that is adapted to releasably retain slidably mounted clamping components on the rail arm of the J-bar.

The detent component 210, in the embodiment chosen for illustration (FIG. 19), is formed in the distal end of rail arm 162. It includes a spring biased tongue that is pivotally mounted to pivot pin 216 for pivotal movement in guide slot 214. A coiled compression spring 218 retained by spring retainer 220 serves to bias tongue 212 toward the retaining configuration. Depressing the tongue 212 against the force of spring 218 serves to move the tongue into slot 214 below the level where it engages a component that is slidably mounted on rail arm 162. When a component is slidably mounted on rail arm 162 so that it is moving from the distal end towards the proximal end of rail arm 162, the component itself contacts the back of the tongue, thus causing the tongue to deflect out of engagement with the component. It is necessary to manually depress the tongue to release a component that is sliding towards the distal end of the rail arm. Slideable disengagement of the component thus requires the affirmative intervention of the operator to release the component while slideable engagement does not.

With particular reference to FIG. 11, there is illustrated a configuration of the components of the present system wherein two workpieces are clamped together using a configuration of the present system wherein the concave nature of workpiec 180 is accommodated by mounting extender block 28 to J-bar pad 176. Workpiece 178 is clamped to workpiece 180 by the action of X-axis clamp component. Any small taper in the thickness of the workpieces is automatically accommodated by swivel pad 174.

With particular reference to FIG. 12, there is illustrated a configuration of the components of the present system wherein two J-bar components are employed. The J-bars are linked together through a long L-link component 32, and the workpiece 182 is spaced from the components of the system except where a clamping action is desired by the use of two extended blocks 28. The extended blocks are mounted to threaded holes 177 in J-bar pads 176 by way of threaded studs 156. The L-link component 32 is mounted to the threaded axially extending bores (not shown) in extender blocks 28 by way of threaded fastener elements of which 181 is typical. The use of two linked J-bars provides a very solid clamping arrangement so that vigorous operations can be performed on or with work piece 182 without concern for dislodging it.

Figure 13:
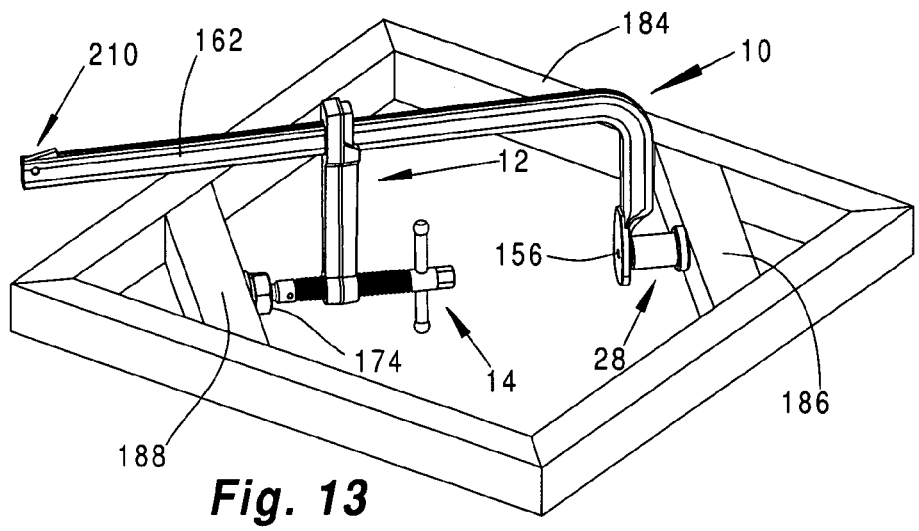
FIG. 13 diagrammatically depicts various details of an embodiment of a clamping fixture using components of a clamping system according to the present invention wherein one J-bar component is configured in an expansion C-clamp configuration with an extension block.

With particular reference to FIG. 13, there is illustrated a configuration of the components of the present system wherein the components are assembled into an expansion clamping configuration where diagonals 186 and 188 are forced in opposite directions into the frame 184.

With particular reference to FIG. 14, there is illustrated a configuration of the components of the present system wherein two workpieces are clamped together similarly to FIG. 11 except that the system is configured so that the extender block 28 serves as a support for the system, and the foot 164 of J-bar 10 is received within the channel of an open bench mount 26. With this configuration the workpieces 190 and 192 can be clamped at some remote location, and the clamp-workpiece assembly brought to a predefined work station where open bench rest 26 is mounted, for example, to a bench. Some one or more operations can then be performed on the clamped workpieces at the predefined work station when the foot 164 is secured in the bench rest.

With particular reference to FIG. 15, there is illustrated a configuration of the components of the present system wherein The rail arm 162 of a J-bar 10 is slidably mounted in closed bench rests 24 and secured there by the actuation of thumb screws 98. This provides a fixed work station. Workpiece 194 is brought to this workstation and clamped there. Because of the cylindrical configuration of the workpiece a V-pad 30 is used. V-pad 30 is simply clamped between the swivel foot pad 174 and the workpiece.

With particular reference to FIG. 16, there is illustrated a configuration of the components of the present system wherein two workpieces 198 and 200 are clamped in position so that one can be joined to the other. Two J-bars are employed. They are linked together through an L-link. The L-link is attached to the threaded mounting holes 177 through threaded fasteners. A V-pad 30 is attached to one of the J-bars by the same threaded fastener that mounts the L-link.

With particular reference to FIG. 17, there is illustrated a configuration of the components of the present system wherein an angled joint V-block is employed with two J-bars 10. The J-bars are secured by suitable fastening elements to the respective V-blocks. Workpieces 202 and 204 are clamped at about right angles to one another and held securely in that relationship.

Figure 18:
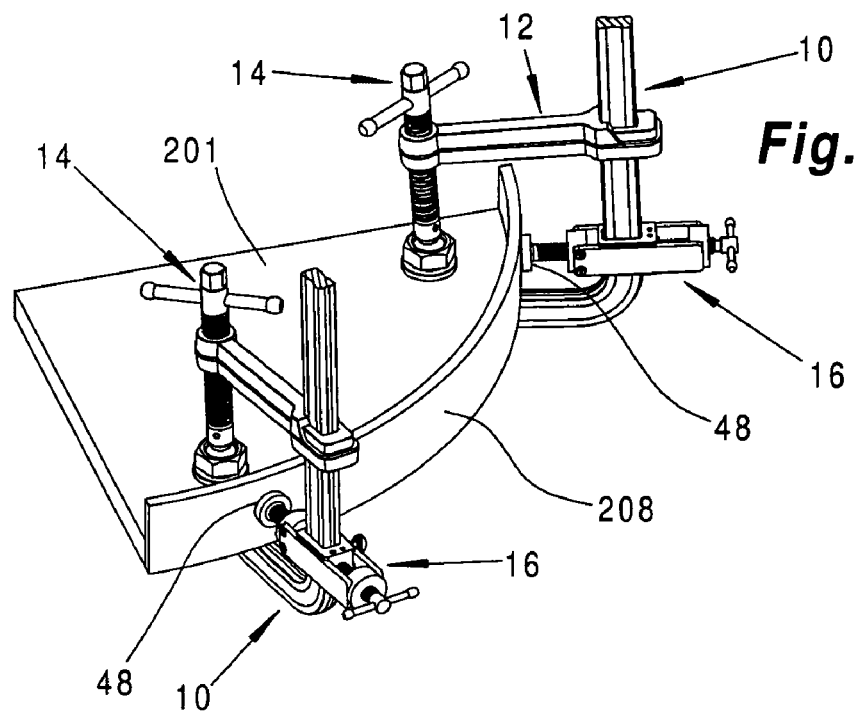

With particular reference to FIG. 18, there is illustrated a configuration of the components of the present system wherein two J-bars 10 are employed, each with a Y-axis attachment 16 to applying clamping force along the Y-axis of the system. The clamping force causes workpiece 208 to conform to the edge of workpiece 201.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. A multifunctional workpiece clamping system comprising:
 a multiplicity of clamp components including at least a J-bar having a rail arm and a J-bar pad, said J-bar pad including a fastener mounting element, an adjustable X-axis clamp screw adapted to being slidably mounted on said rail arm, a Y-axis adjustable clamp screw adapted to being slidably mounted on said rail arm, a bench rest adapted to receiving said rail arm, an extender block adapted to being mounted to said J-bar pad, an L-link adapted to being mounted to said J-bar pad, a V-pad adapted to being mounted to said J-bar pad, and a joint V-block adapted to being mounted to said J-bar pad.

2. A multifunctional workpiece clamping system of claim 1 wherein said bench rest is adapted to slidably receiving said rail arm.

3. A multifunctional workpiece clamping system of claim 1 wherein at least said joint V-block and said bench rest are further adapted to being mounted to a supporting substrate.

4. A multifunctional workpiece clamping system of claim 1 including at least two said J-bars.

5. A multifunctional workpiece clamping system of claim 1 wherein said bench rest is adapted to laterally receiving said rail arm.

6. A multifunctional workpiece clamping system of claim 1 including two said bench rests.

7. A multifunctional workpiece clamping system of claim 1 including two said joint V-blocks.

8. A multifunctional workpiece clamping system of claim 1 including two said L-links.

9. A multifunctional workpiece clamping system of claim 1 wherein at least said V-pad is further adapted to being mounted to a supporting substrate.

* * * * *